US 9,219,643 B2

(12) United States Patent
Yang

(10) Patent No.: US 9,219,643 B2
(45) Date of Patent: Dec. 22, 2015

(54) NODE AND METHOD FOR THE HANDLING OF SERVING GATEWAY PARTIAL FAILURE

(71) Applicant: Telefonaktiebolaget L M Ericsson (publ), Stockholm (SE)

(72) Inventor: Yong Yang, Mölndal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 252 days.

(21) Appl. No.: 13/666,994

(22) Filed: Nov. 2, 2012

(65) Prior Publication Data

US 2013/0114404 A1 May 9, 2013

Related U.S. Application Data

(60) Provisional application No. 61/555,116, filed on Nov. 3, 2011.

(51) Int. Cl.
*H04L 12/24* (2006.01)
*H04W 24/04* (2009.01)
*H04L 29/06* (2006.01)
*H04L 29/14* (2006.01)
H04W 8/30 (2009.01)
H04W 88/16 (2009.01)

(52) U.S. Cl.
CPC .......... *H04L 41/0677* (2013.01); *H04L 65/105* (2013.01); *H04L 65/1016* (2013.01); *H04L 65/1046* (2013.01); *H04L 69/40* (2013.01); *H04W 24/04* (2013.01); H04L 41/0663 (2013.01); H04L 41/0668 (2013.01); H04W 8/30 (2013.01); H04W 88/16 (2013.01); Y02B 60/43 (2013.01)

(58) Field of Classification Search
CPC .................................................... H04L 41/0677
USPC .............. 370/218, 221, 225, 328; 455/435.2; 726/1
See application file for complete search history.

(56) References Cited

U.S. PATENT DOCUMENTS

2010/0056146 A1* 3/2010 Guo et al. .................. 455/435.2
2011/0176413 A1* 7/2011 Tanabe et al. ................. 370/225
2012/0063300 A1* 3/2012 Sahin et al. ................... 370/225
2012/0233656 A1* 9/2012 Rieschick et al. ................ 726/1
2012/0250616 A1* 10/2012 Hu et al. ....................... 370/328

OTHER PUBLICATIONS

3rd Generation Partnership Project; Technical Specification Group Core Network and Terminals; Restoration procedures (Release 10); 3GPP TS 23.007 V10.5.0 (Sep. 2011); pp. 1-52.*

* cited by examiner

Primary Examiner — Brian D Nguyen
Assistant Examiner — Toan Nguyen
(74) Attorney, Agent, or Firm — Rothwell, Figg, Ernst & Manbeck, P.C.

(57) ABSTRACT

Example embodiments presented herein are directed towards improved handling during Serving Gateway (SGW) partial failures. Some of the example embodiments are directed towards a Mobility Management Entity (MME) configured to alter a S4 Serving General Packet Radio Service Support Node (S4-SGSN) that a SGW partial failure has occurred. Some of the example embodiments are directed towards a Packet Data Network Gateway (PGW) being informed that ISR for a user equipment is activated, this the PGW will save any MME related identification information for a user equipment undergoing a mobility procedure when ISR is activated.

16 Claims, 9 Drawing Sheets

NODE AND METHOD FOR THE HANDLING OF SERVING GATEWAY PARTIAL FAILURE

RELATED APPLICATIONS

This application claims the benefit of U.S. Provisional Application No. 61/555,116, filed on Nov. 3, 2011. The entire teachings of the above application are incorporated herein by reference.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which is also referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

SUMMARY

The wireless networks described above comprise various network nodes. A considerable amount of effort is placed on providing procedures and protocols for the failures of such nodes. An example of such a failure is a partial node failure in which only a sub-set of connections associated with a particular node fails. Thus, at least one example objective of the example embodiments is to provide an improved handling for partial node failures when the Idle Mode Signaling Reduction function has been activated. In particular, some of the example embodiments are directed towards providing improved handling for Serving Gateway partial failures when the Idle Mode Signaling Reduction is activated.

An example advantage of some of the example embodiments described herein may be ensuring that services are delivered to a user equipment when an EPC node has experienced a partial failure. Another example advantage of some of the example embodiments presented herein is to improve enhanced partial failure recovery during ISR. In particular, to provide the various nodes of the network with identification information which may be used to delete or re-establish any PDN connections which may have been affected by the partial failure.

Some of the example embodiments are directed towards a method, in a MME node, for partial failure handing when ISR is activated. The MME node is comprised in a communications network. The method comprises receiving, from a SGW node, a notification of a partial failure within the SGW node. The notification comprises an identification of at least one user equipment associated with an affected set of PDN connections. The method further comprises processing bearers associated with the affected set of PDN connections. The method also comprises sending, to a S4-SGSN, a failure notification message indicating that the SGW node has a partial failure. The failure notification message comprises the identification of the at least one user equipment associated with the affected set of PDN connections.

Some of the example embodiments are directed towards a MME node for partial failure handing when ISR is activated. The MME node is comprised in a communications network. The MME comprises interface circuitry configured to receive, from a SGW node, a notification of a partial failure within the SGW node. The notification comprises an identification of at least one user equipment associated with an affected set of PDN connections. The MME node further comprises processing circuitry configured to process bearers associated with the affected set of PDN connections. The interface circuitry is further configured to send, to a S4-SGSN, a failure notification message indicating that the SGW node has a partial failure, the failure notification message comprising the identification of the at least one user equipment associated with the affected set of PDN connections.

Some of the example embodiments are directed towards a method, in a PGW node, for partial failure handing when ISR is activated. The PGW node is comprised in a communications network. The method comprises receiving, from a SGW node, a Modify Bearer Request for a user equipment during a RAU procedure. The Modify Bearer Request comprising a MME FQ-CSID. The method further comprises identifying that ISR is activated for the user equipment based on the Modify Bearer Request message and saving the MME FQ-CSID based on the identifying.

Some of the example embodiments are directed towards a PGW node for partial failure handing when ISR is activated. The PGW node is comprised in a communications network. The PGW node comprises interface circuitry configured to receive, from a SGW node, a Modify Bearer Request for a user equipment during a RAU procedure. The Modify Bearer Request comprises a MME FQ-CSID. The PGW node further comprises processing circuitry configured to identify that ISR is activated for the user equipment based on the Modify Bearer Request message. The processing circuitry is further configured to save the MME FQ-CSID based on the identifying.

Some of the example embodiments are directed towards a method, in a S4-SGSN, for partial failure handing when ISR is activated. The S4-SGSN is comprised in a communications network. The method comprises receiving, from a MME, a failure notification message indicating that a SGW node has a partial failure. The failure notification message comprises identification information for at least one user equipment associated with an affected set of PDN connections. The method further comprises processing bearers associated with the affected set of PDN connections.

Some of the example embodiments are directed towards a S4-SGSN for partial failure handing when ISR is activated. The S4-SGSN is comprised in a communications network. The S4-SGSN comprises interface circuitry configured to receive, from a MME, a failure notification message indicating that a SGW node has a partial failure. The failure notification message comprises identification information for at least one user equipment associated with an affected set of PDN connections. The S4-SGSN further comprises processing circuitry configured to process bearers associated with the affected set of PDN connections.

DEFINITIONS

3GPP Third Generation Partnership Project
BSC Base Station Controller
eNodeB enhanced Node B
ePDG enhanced Packet Data Gateway
DNS Domain Name System
EPC Evolved Packet Core
E-UTRAN Evolved UTRAN
FQ-CSID Fully qualified-Connection Set Identifier
FQ-TEID Fully qualified-Tunneling Endpoint Identifier
GERAN GSM Edge Radio Access Network
GGSN Gateway GPRS Support Node
GPRS General Packet Radio Service
GSM Global System for Mobile Communications
GTP GPRS Tunneling Protocol
HSS Home Subscriber Server
IMSI International Mobile Subscriber Identity
ISR Idle Mode Signaling Reduction
LMA Local Mobility Anchor
LTE Long Term Evolution
MAG Mobile Access Gateway
MME Mobility Management Entity
PBA Proxy Binding Acknowledgment
PBU Proxy Binding Update
P-CSCF Proxy-Call Session Control Function
PCO Protocol Configuration Option
PCRF Policy and Charging Rules Function
PDN Packet Data Network
PDP Packet Data Protocol
PGW PDN Gateway
PMIP Proxy Mobile Internet Protocol
RA Routing Area
RAN Radio Access Network
RAT Radio Access Type
RAU Routing Area Update
RBS Radio Base Station
RNC Radio Network Controller
SGSN Serving GPRS Support Node
SGW Serving Gateway
TA Tracking Area
TAU Tracking Area Update
UE user equipment
UTMS Universal Mobile Telecommunications System
UTRAN UMTS Terrestrial Radio Access Network
WCDMA Wideband Code Division Multiple Access
WLAN Wireless Local Area Network

BRIEF DESCRIPTION

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
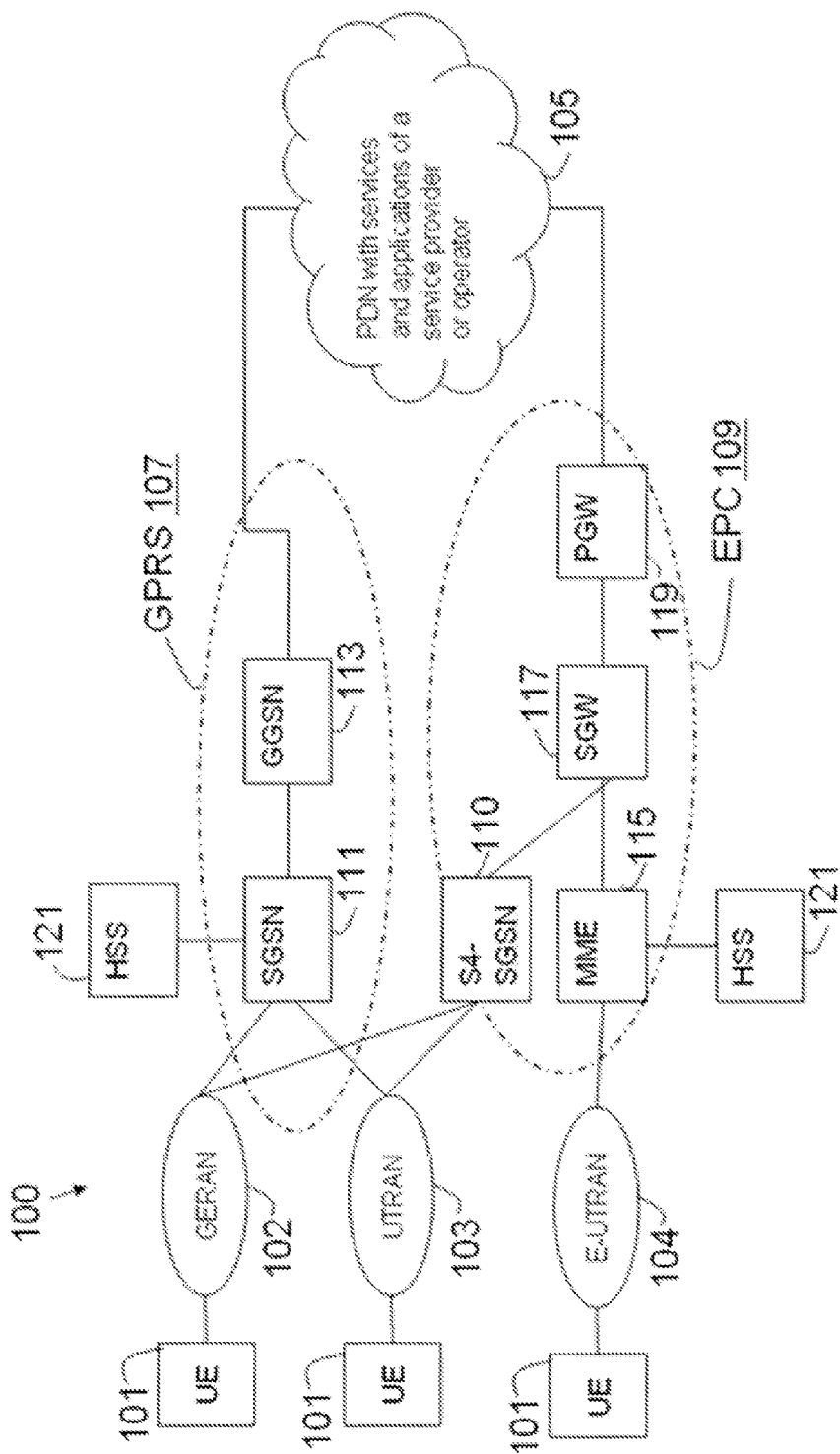
FIG. 1 is an illustration of an example communications network.

In order to provide a better explanation of the example embodiments presented herein, a problem will first be identified and discussed. FIG. 1 provides an example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the operator or application server 105.

The EPC subsystem 109 may comprise a Mobility Management Entity 115, which may be responsible for idle mode UE tracking, paging procedures, and attachment and activation processes. The EPC subsystem may also comprise a Serving Gateway (SGW) 117, which may be responsible for the routing and forwarding for data packets. The EPC subsystem may also include a Packet data network Gateway (PGW) 119, which may be responsible for providing connectivity from the user equipment 101 to the operator of application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

During operation any of the nodes featured in FIG. 1 may be subject to a failure. In some instances, the failure may be a partial failure. During a partial failure, only a sub-set of PDN connections being serviced by the failed node may be affected.

Figure 2:
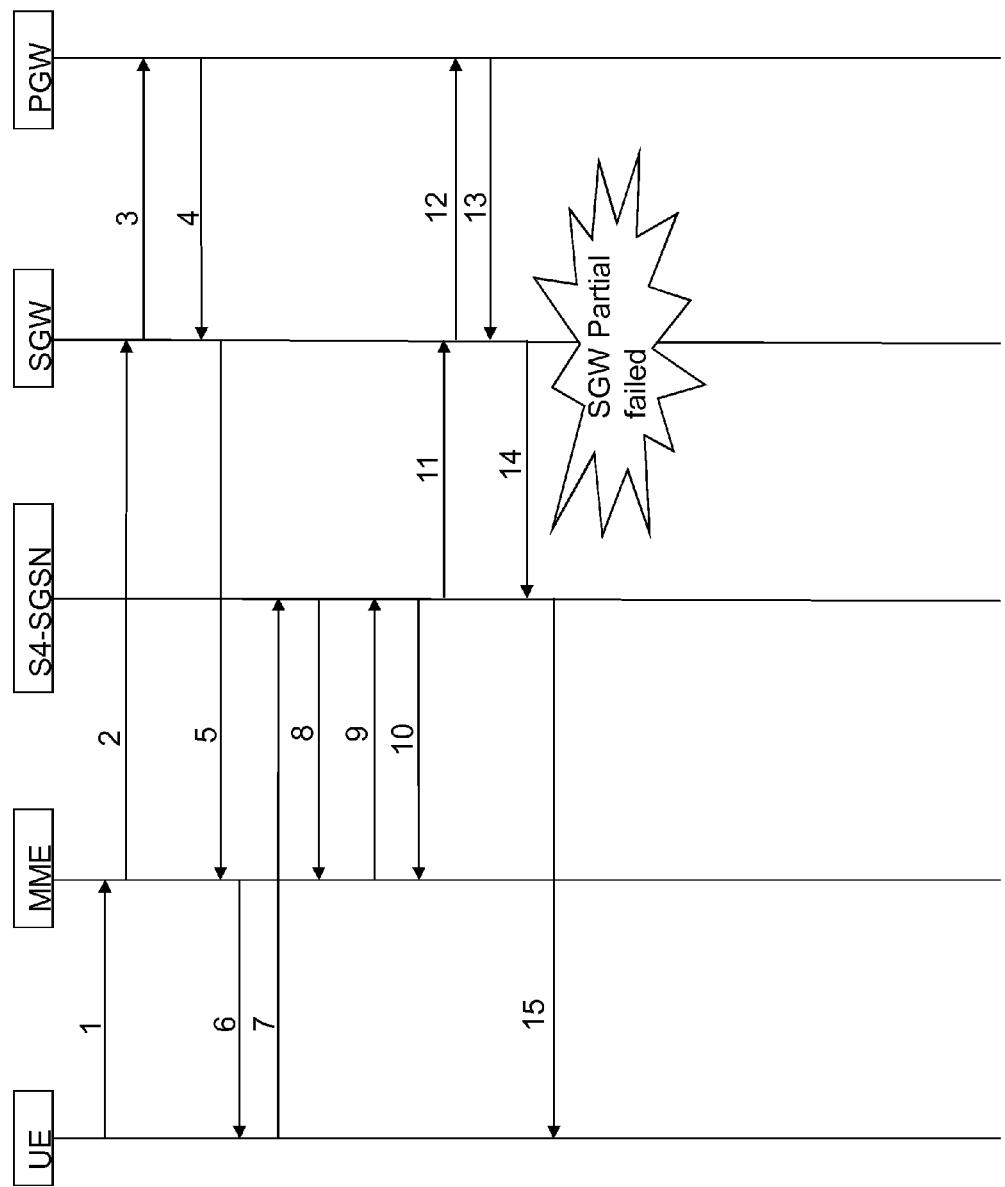
FIG. 2 is a message passing diagram of a partial SGW failure during ISR.

FIG. 2 provides an example of such a partial failure. First, a user equipment may send an Attach request to a MME (message 1). Thereafter, the MME will send a Create Session Request message to a SGW node (message 2). The Create Session Request message comprises MME FQ-CSID. A FQ-CSID identifies a set of PDN connections within a node that may belong to an arbitrary number of user equipments. Each node may maintain a local mapping of CSID to its internal resources. FQ-CSID is a combination of the node identity and the CSID assigned by the node which together globally identifies a set of PDN connections. Thus, in case of a failure, one or more CSIDs may be signalled to peer nodes so that the peer nodes will have knowledge of which PDN connections will need to be re-established or deleted.

Upon receiving the message from the MME, the SGW will send, to the PGW node, a Create Session Request message comprising the received MME FQ-CSID and the SGW's own identifiers SGW FQ-CSID (message 3). The PGW node will respond with a Create Session Response message comprising the PGW's identifiers, PGW FQ-CSID (message 4). The SGW will thereafter send a Create Session Response to the MME comprising the SGW FQ-CSID and the PGW FQ-CSID (message 5). The MME will then send an Attach Accepted message to the user equipment (message 6).

During operation, the user equipment may move to towards a UTRAN/GERAN subsystem and send a RAU request message to a S4-SGSN (message 7). The S4-SGSN will then send a Context Request message to the old serving mobility management node, which in this case is the MME (message 8). The MME will thereafter send a Context Response message to the S4-SGSN (message 9) and the S4-SGSN will acknowledge the message (message 10). Messages 8-10 are known as a context transfer procedure where an old serving node will provide the new serving node with various forms of information. For example, PDN connection information and user equipment mobility management information or any other form of information needed to serve the user equipment.

The S4-SGSN will then send, to the SGW, a Modify Bearer Request (message 11). The network may make a decision to activate ISR for the user equipment. If such a decision is made, an indication may be placed in the Modify Bearer Request message. The SGW will then send a Modify Bearer Request message to the PGW comprising SGW FQ-CSID (message 12).

It should be appreciated that the SGW does not inform the PGW that ISR will be active for the user equipment. Since the PGW node does not have knowledge that ISR will be active for the user equipment, the PGW will delete any associated MME FQ-CSID information for the PDN connection, associated with the user equipment requesting the RAU procedure, which was received during the previous attach procedure. It should also be appreciated that the PGW will not have S4-SGSN FQ-CSID. Since the S4-SGSN does not support partial failure, the S4-SGSN will not provide SGSN FQ-CSID to the SGW or PGW. Thus, the PGW will not have FQ-CSID for the MME or the S4-SGSN.

Thereafter, the PGW will send a Modify Bearer Response message to the SGW comprising PGW FQ-CSID (message 13). As a result, the SGW will also send a Modify Bearer Response message to the S4-SGSN without the SGW FQ-CSID since the SGSN did not previously provide the SGSN FQ-CSID due to the SGSN not supporting partial failures (message 14). The S4-SGSN will thereafter send a RAU Accept message to the user equipment (message 15). The RAU Accept message will comprise an indication or instructions for the user equipment to activate ISR.

ISR is a feature that reduces the mobility signalling of a user equipment and therefore improves the battery life of the user equipments. During ISR, the user equipment may remain simultaneous registered in an UTRAN/GERAN Routing Area (RA) and an E-UTRAN Tracking Area (TA) list. This allows the user equipment to make cell reselections between E-UTRAN and UTRAN/GERAN without a need to send a TAU or RAU request, as long as it remains within the registered RA and TA list.

Thus, during operation, if the MME has a partial failure, the PGW will not have any identification information for the MME serving the user equipment. Furthermore, the PGW will not be able to identify the PDN connection affected by the partial failure since the PGW has deleted all MME FQ-CSID, as explained in relation to message 12. It should also be appreciated that since the SGSN does not support partial failure, when the SGW has a partial failure, the SGSN will have no knowledge that the SGW partial failure has occurred. Therefore, a user equipment that is camping between 2G and/or 3G with the PDN connections affected by a SGW partial failure will not be able to receive mobile terminating services until the user equipment attempts to contact the network initially.

The example embodiments presented herein provide an improved handling for partial node failures. In particular, some of the example embodiments are directed towards providing improved handling for Serving Gateway partial failures in during an Idle Mode Signalling Reduction such that any interruptions in service may be kept at a minimum. Thus, some of the example embodiments may be directed towards informing a PGW that ISR has been activated thereby instructing the PGW to save any MME related data. Furthermore, some of the example embodiments may be directed towards providing an indication to the S4-SGSN that a SGW partial failure has occurred.

Figure 3:
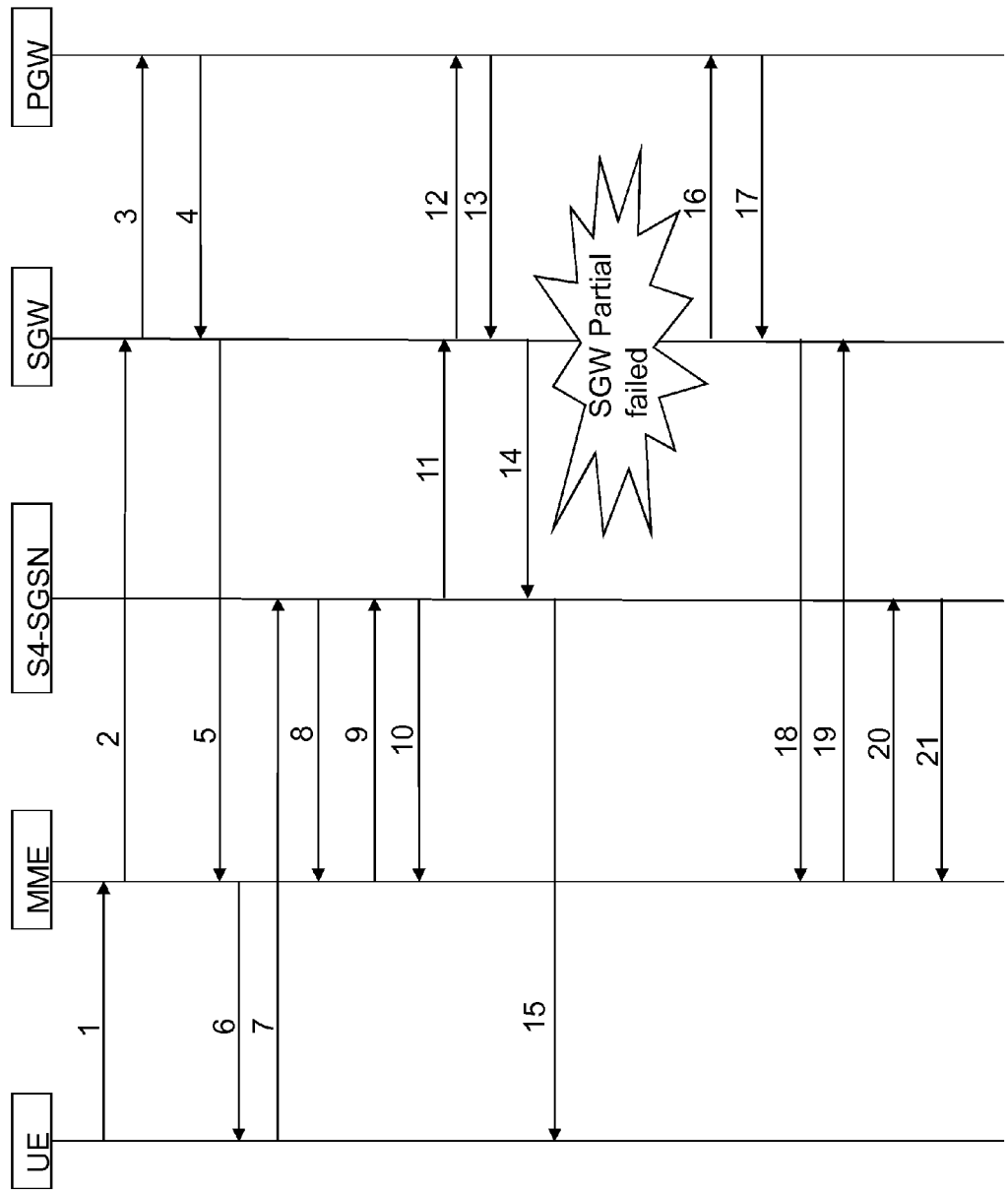
FIG. 3 is a message passing diagram of a partial SGW failure during ISR, according to some of the example embodiments.

FIG. 3 is a message signalling diagram utilizing some of the example embodiments presented herein. Messages 1-7 may be performed in a similar manner as described in relation to FIG. 2. According to some of the example embodiments, once the S4-SGSN receives the RAU Request message from the user equipment (message 7), the S4-SGSN will send a Context Request message to the MME (message 8). Thereafter, the MME may send the S4-SGSN a Context Response (message 9) and the S4-SGSN may send the MME a Context Acknowledgement message (message 10).

According to some of the example embodiments, in the Context Response message (message 9), the MME may provide information regarding SGW partial failure notifications. Such information may be in the form of an information element, a flag or a cause code informing the S4-SGSN that the MME will inform the S4-SGSN in the event of a SGW partial failure. In the acknowledgement message (message 10) or request message (message 8), the S4-SGSN may confirm or provide support for the failure notification via a capability indicator indicating a support for a failure notification message. It should be appreciated that the capability indicator may be in the form of a flag, information element, cause code, or any other form of indication known in the art.

Thereafter, the S4-SGSN may send a Modify Bearer Request to the SGW (message 11). The network may make a decision to activate ISR for the user equipment. If such a decision is made, an indication called ISRAI may be placed in the Modify Bearer Request message. The SGW may forward the Modify Bearer Request message to the PGW (message 12). According to some of the example embodiments, the Modify Bearer Request message may comprise a flag informing the PGW that ISR will be active. In response to the flag, the PGW will keep all MME related data associated with the user equipment, for example, the MME FQ-CSID, and may apply other restrictions. An example of such a restriction may be not changing the PGW FQ-CSID. The Modify Bearer Request message may also itself comprise MME identification information, for example, MME FQ-CSID. Thus, in contrast to the scenario described in FIG. 2, the PGW now has knowledge that the user equipment will undergo a ISR and therefore MME related information (e.g., MME FQ-CSID) will be saved as the user equipment may communicate with both the MME and S4-SGSN without notifying the network of a RAT change. Thereafter, Modify Bearer Response messages and a RAU Accept message may be transmitted which comprises an indication or instructions for the user equipment to activate ISR and the user equipment will activate ISR.

At some point during operation, the SGW may experience a partial failure. Once the SGW detects the partial failure, the SGW will send a Delete PDN Connection Set Request to the PGW (message 16). The Delete PDN Connection Set Request message may comprise the SGW FQ-CSID identifying the PDN connections that were affected by the partial SGW failure. Upon receiving the request, the PGW will retrieve the affected PDN connections and delete or re-establish the connections, for example, as described in 3GPP TS 23.007, which is incorporated herein by reference. Alternatively, the PGW may maintain the PDN connections based on a local configuration as specified in the sub-clause 6.8.2.1 in 3GPP TR 23.857, which is incorporated herein by reference. The PGW will thereafter send a Delete PDN Connection Set Response message to the SGW (message 17).

Thereafter, the SGW will send a Delete PDN Connection Set Request to the MME (message 18). Similar to message 16, the message provided to the MME will also comprise the SGW FQ-CSID identifying the PDN connections that were affected by the partial SGW failure. The MME may retrieve the affected PDN connections and delete them as specified in 3GPP TS 23.007. The MME may alternatively maintain the PDN connections based on a local configuration or from information provided by the SGW as described in the sub-clause 6.8.2.1 in 3GPP TR 23.857.

The MME is aware that the S4-SGSN does not support partial failure and that the SGW has encountered a partial failure. Therefore, the MME may send a new S3 GTPv2 message Failure Notification to the S4-SGSN per user equipment or PDN connection or per multiple user equipments where multiple IMSIs or F-TEIDs of the user equipments are provided to the S4-SGSN (message 20). The message may also comprise other capability indication such as how the partial failure recover should be carried out. Upon receiving the message, the S4-SGSN may send an acknowledgment message to the MME (message 21).

The MME and S4-SGSN may now, based on local configurations or information provided during the capability exchange (messages 8-10) start procedures as specified in 6.8.2.1 in 3GPP TR23.857. Since the PGW will have the MME identifier when ISR is activated (via message 12), the PGW may initiate a Paging Request relayed by a SGW to the MME. The MME may forward the paging request to the S4-SGSN.

Figure 4:
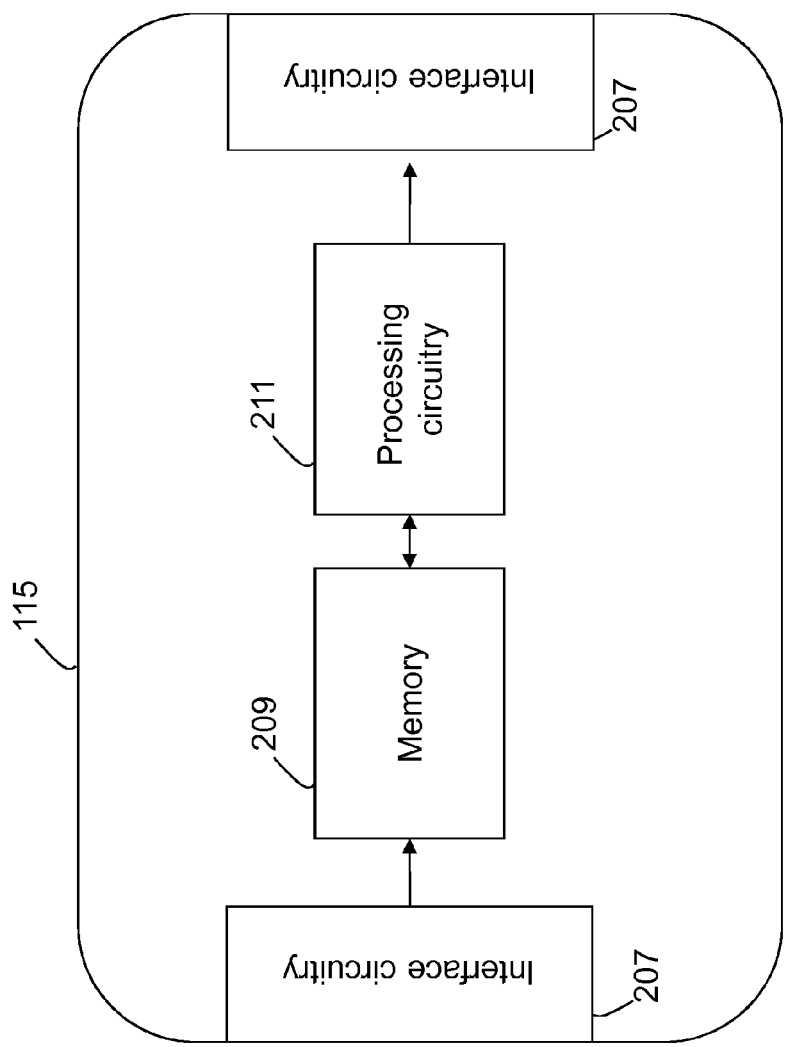
FIG. 4 is an example node configuration of a MME, according to some of the example embodiments.

FIG. 4 is an illustrative example of a MME node 115 according to some of the example embodiments. The MME node 115 may comprise interface circuitry 207. The interface circuitry 207 may be configured to receive and transmit any form of communications data. It should be appreciated that the MME node 115 may comprise any number of units or interface circuitry 207 or a single transceiver port. It should further be appreciated that the interface circuitry 207 may be in the form of any input/output communications port or circuitry known in the art.

The MME node 115 may further comprise at least one memory unit 209. The memory unit 209 may be configured to store received, transmitted, and/or measured data of any kind and/or executable program instructions. The memory unit 209 be any suitable type of computer readable memory and may be of a volatile and/or non-volatile type.

The MME node 115 may also comprise processing circuitry 211 that may be configured to provide SGW partial failure handling as described herein. It should be appreciated that the processing circuitry 211 may be any suitable type of computation unit, e.g. a microprocessor, digital signal processor (DSP), field programmable gate array (FPGA), or application specific integrated circuit (ASIC). It should also be appreciated that the processing circuitry 211 need not be comprised as a single unit. The processing circuitry 211 may be comprised as any number of units.

Figure 5:
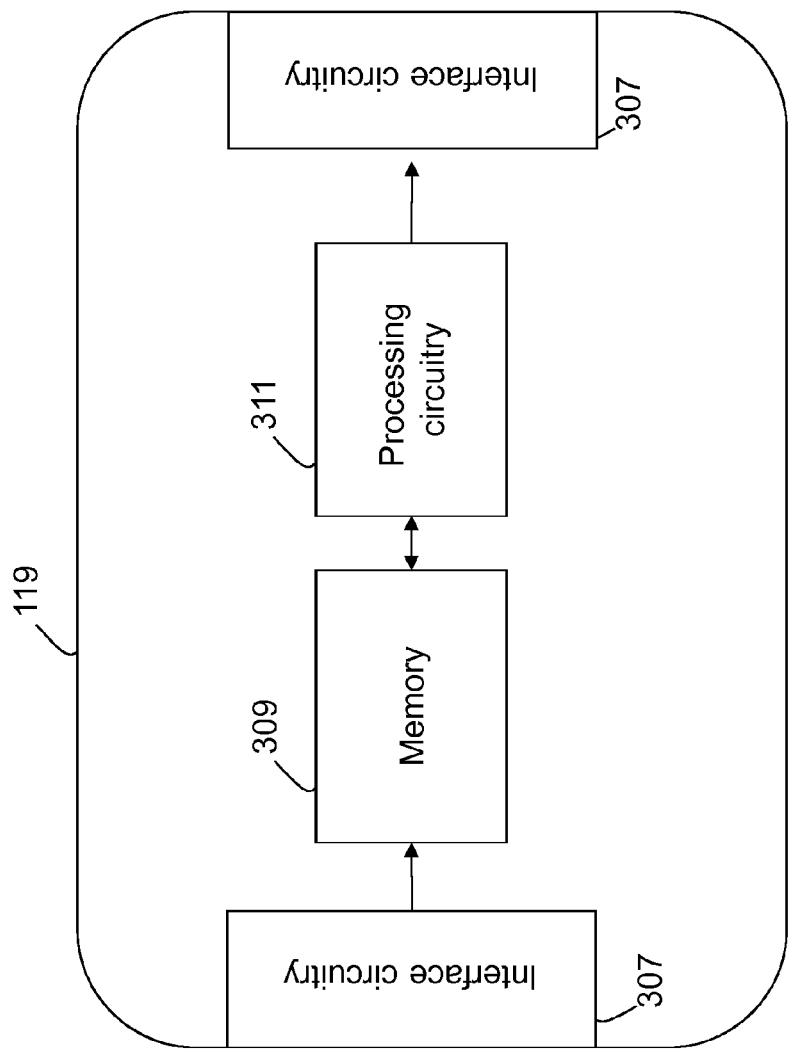
FIG. 5 is an example node configuration of a PGW, according to some of the example embodiments.

FIG. 5 is an illustrative example of a PGW node 119 according to some of the example embodiments. The PGW node 119 may comprise interface circuitry 307 which may be configured to receive and transmit any form of communications data. It should be appreciated that the PGW node 119 may comprise any number of interface circuitry units or a single interface circuitry unit. It should further be appreciated that the interface circuitry 307 may be in the form of any input/output communications port or circuitry known in the art.

The PGW node 119 may further comprise at least one memory unit 309. The memory unit 309 may be configured to store received, transmitted, and/or measured data of any kind and/or executable program instructions. The memory unit 309 be any suitable type of computer readable memory and may be of a volatile and/or non-volatile type.

The PGW node 119 may also comprise processing circuitry 311 that may be configured to provide SGW partial failure handling as described herein. The processing circuitry 311 may be any suitable type of computation unit, e.g. a microprocessor, digital signal processor (DSP), field programmable gate array (FPGA), or application specific integrated circuit (ASIC). It should also be appreciated that the processing circuitry 311 need not be comprised as a single unit. The processing circuitry 311 may be comprised as any number of units.

Figure 6:
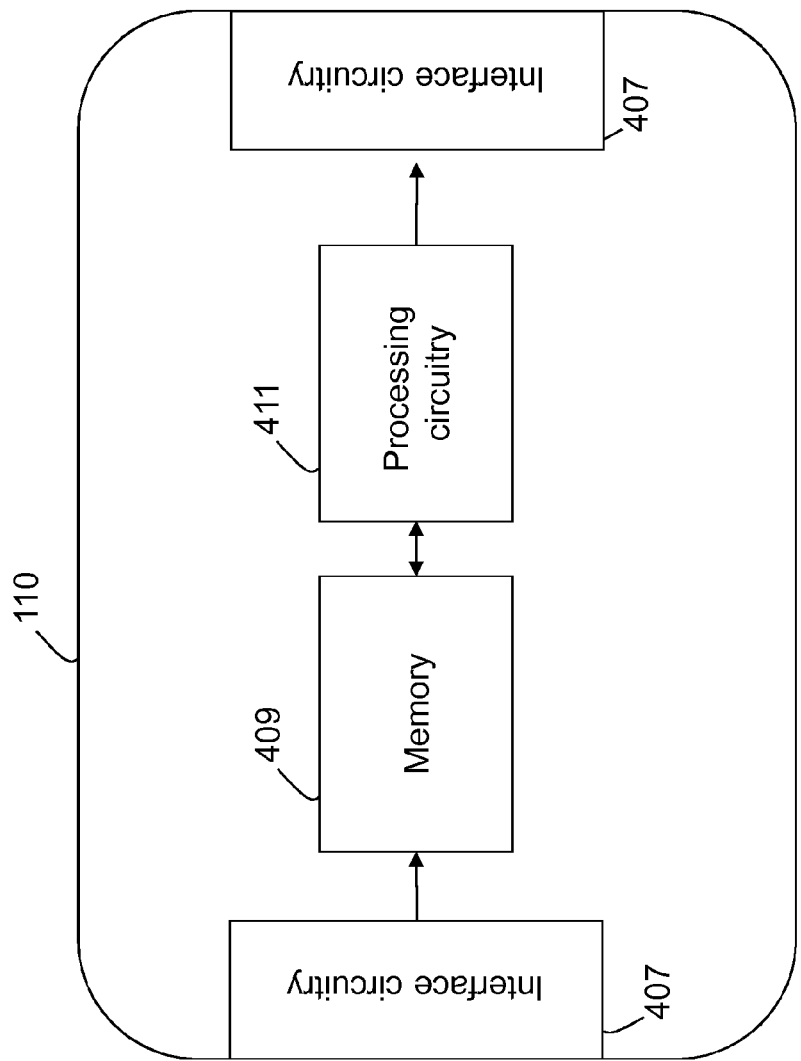
FIG. 6 is an example node configuration of a S4-SGSN, according to some of the example embodiments.

FIG. 6 is an illustrative example of a S4-SGSN 110 according to some of the example embodiments. The S4-SGSN 110 may comprise interface circuitry 407 which may be configured to receive and transmit any form of communications data. It should be appreciated that the S4-SGSN 110 may comprise any number of interface circuitry units or a single interface circuitry unit. It should further be appreciated that the interface circuitry 407 may be in the form of any input/output communications port or circuitry known in the art.

The S4-SGSN 110 may further comprise at least one memory unit 409. The memory unit 409 may be configured to store received, transmitted, and/or measured data of any kind and/or executable program instructions. The memory unit 409 be any suitable type of computer readable memory and may be of a volatile and/or non-volatile type.

The S4-SGSN 110 may also comprise processing circuitry 411 that may be configured to provide SGW partial failure handling as described herein. The processing circuitry 411 may be any suitable type of computation unit, e.g. a microprocessor, digital signal processor (DSP), field programmable gate array (FPGA), or application specific integrated circuit (ASIC). It should also be appreciated that the processing circuitry 411 need not be comprised as a single unit. The processing circuitry 411 may be comprised as any number of units.

Figure 7:
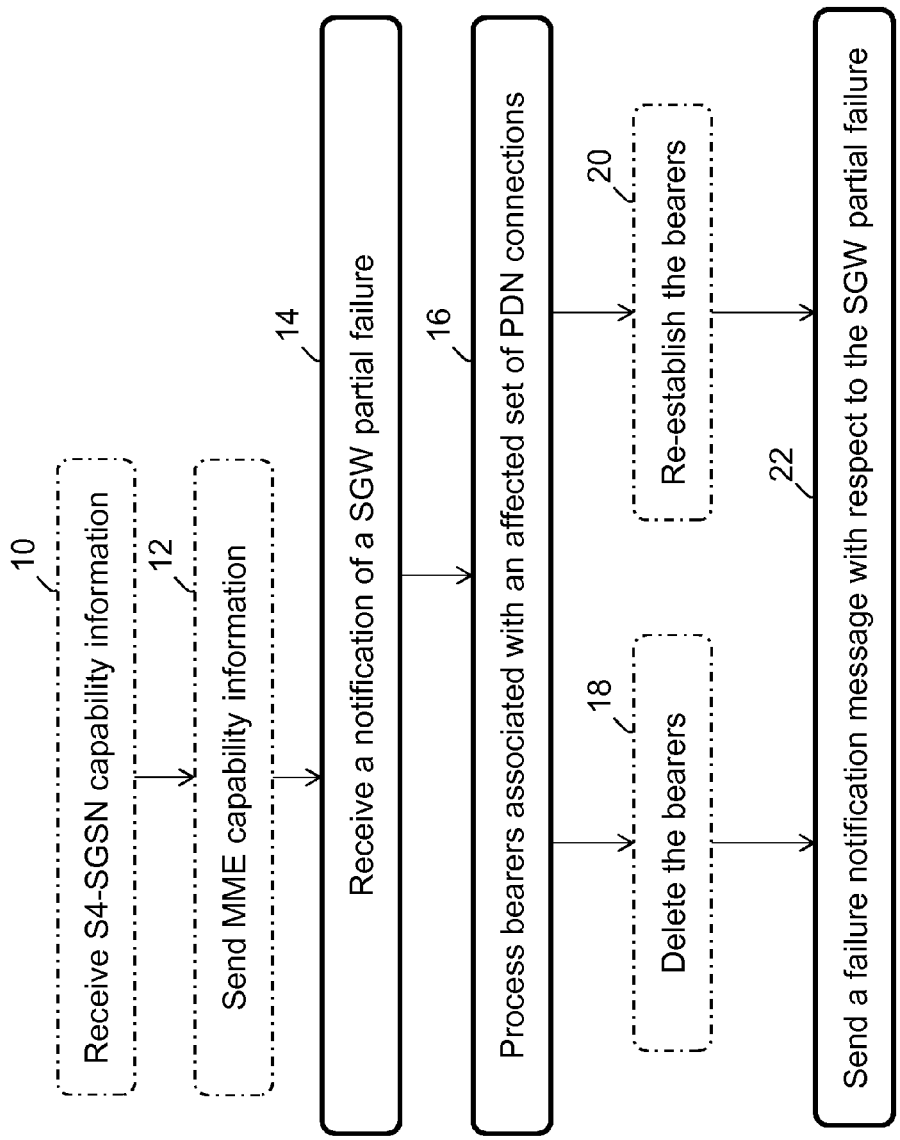
FIG. 7 is a flow diagram of example operations which may be taken by the MME of FIG. 4, according to some of the example embodiments.

FIG. 7 is a flow diagram depicting example operations which may be taken by the MME node 115 of FIGS. 1-4 in the providing SGW partial failure handling. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 10

According to some of the example embodiments, the MME 115 may be configured to receive 10, from a S4-SGSN 110, a context request message during a context transfer procedure. The context request message may comprise a S4-SGSN capability indicator indicating a support of a failure notification message. The interface circuitry 207 may be configured to receive, from the S4-SGSN 110, the context request message during the context transfer procedure.

It should be appreciated that the context transfer procedure may be the procedure illustrated in FIG. 3 (messages 8-10). Furthermore, the context request message may be similar to message 8 of FIG. 3. It should further be appreciated that the S4-SGSN capability indicator may also be provided in the context acknowledgement message, for example message 10 of FIG. 3.

Example Operation 12

According to some of the example embodiments, upon the receiving 10, the MME 115 may be configured to send 12, to the S4-SGSN 110, a context response message as a result of the context request message, the context response message may comprise a MME capability indicator indicating support for the failure notification message.

It should be appreciated that the context transfer procedure may be the procedure illustrated in FIG. 3 (messages 8-10). Furthermore, the context request message may be similar to message 8 of FIG. 3. It should further be appreciated that such an exchange of information may be used by the MME and S4-SGSN to indicate whether or not each node supports SGW partial failure, according to the example embodiments. Furthermore, the exchange of information may also be used to provide instructions to the S4-SGSN on how bearers should be processed in the event of a SGW partial failure.

Operation 14

The MME 115 is configured to receive 14, from a SGW 117, a notification of a partial failure within the SGW node. The notification comprises an identification of at least one user equipment associated with an affected set of PDN connections. The interface circuitry 207 is configured to receive, from the SGW 117, the notification of a partial failure within the SGW node.

It should be appreciated that such a notification may be similar to the Delete PDN Connection Set Request message of FIG. 3 (message 18). Furthermore, it should be appreciated that the identification may be SGW FQ-CSID.

Operation 16

The MME 115 is further configured to process 16 bearers associated with the affected set of PDN connections. The processing circuitry 211 is configured to process the bearers associated with the affected set of PDN connections. It should be appreciated that the processing may be performed based on an internal MME configuration or based on instructions provided by any other node in the communications network.

Example Operation 18

According to some of the example embodiments, the processing 16 may further comprise deleting 18 the bearers associated with the affected set of PDN connections. The processing circuitry 211 may be configured to delete the bearers associated with the affected set of PDN connections.

Example Operation 20

According to some of the example embodiments, the processing 16 may further comprise re-establishing 20 the bearers associated with the affected set of PDN connections. The processing circuitry 211 may be configured to re-establish the bearers associated with the affected set of PDN connections.

Operation 22

The MME 115 is further configured to send 22, to the S4-SGSN, the failure notification message indicating that the SGW node has a partial failure. The failure notification message comprises the identification of the at least one user equipment associated with the affected set of PDN connections. The interface circuitry 207 is configured to send, to the S4-SGSN, the failure notification message indicating that the SGW node has a partial failure.

It should be appreciated that the failure notification message sent to the S4-SGSN may be similar to the failure notification message of FIG. 3 (message 20). It should further be appreciated that the identification information provided to the S4-SGSN may be identification per user equipment per PDN connection or per multiple user equipments, for example comprising multiple IMSIs or F-TEIDs for user equipments.

Figure 8:
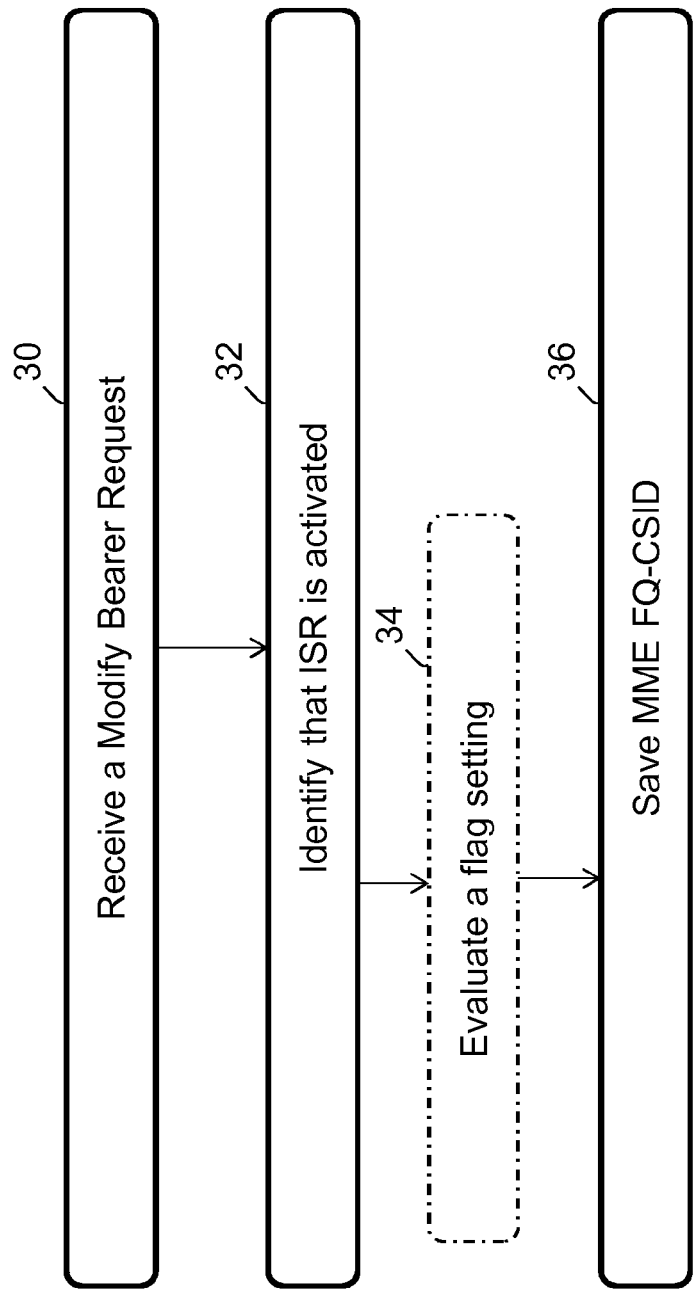
FIG. 8 is a flow diagram of example operations which may be taken by the PGW of FIG. 5, according to some of the example embodiments.

FIG. 8 is a flow diagram depicting example operations which may be taken by the PGW node of FIGS. 1-3 and 5 in the providing SGW partial failure handling. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 30

The PGW node 119 is configured to receive 30, from a SGW 117, a Modify Bearer Request message for a user equipment during a RAU procedure. The Modify Bearer Request message comprises MME FQ-CSID. The interface circuitry 307 is configured to receive, from the SGW node 117, the Modify Bearer Request message for a user equipment during a RAU procedure. It should be appreciated that the Modify Bearer Request message may similar as the message described in FIG. 3 (message 12).

It should be appreciated that the RAU procedure may comprise a RAT change to or from a UTRAN and GERAN based network. It should further be appreciated that the Modify Bearer Request message may further comprise SGW FQ-CSID.

Operation 32

The PGW node 119 is further configured to identify 32 that ISR is activated for the user equipment based on the Modify Bearer Request message. The processing circuitry 311 is configured to identify that ISR is activated for the user equipment based on the Modify Bearer Request message.

Example Operation 34

According to some of the example embodiments, the identifying 32 may further comprising evaluating 34 a flag or cause code comprising in the Modify Bearer Request message. The setting of the flag or cause code may indicate that ISR is activated. The processing circuitry 311 may be configured to evaluate the flag or cause code. It should be appreciated that the identification may also be based on the inclusion of MME FQ-CSID in the Modify Bearer Request message.

Operation 36

The PGW node 119 is further configured to save 36 the MME FQ-CSID based on the identifying 34. The processing circuitry 311 is configured to save the MME FQ-CSID the identification. Thus, now that the PGW has knowledge that the user equipment will activate ISR, and that the user equipment may communicate with both the MME and S4-SGSN without notifying the network of a RAT change, the PGW node 119 will save the MME FQ-CSID in order to communication with the user equipment via the MME if necessary.

Figure 9:
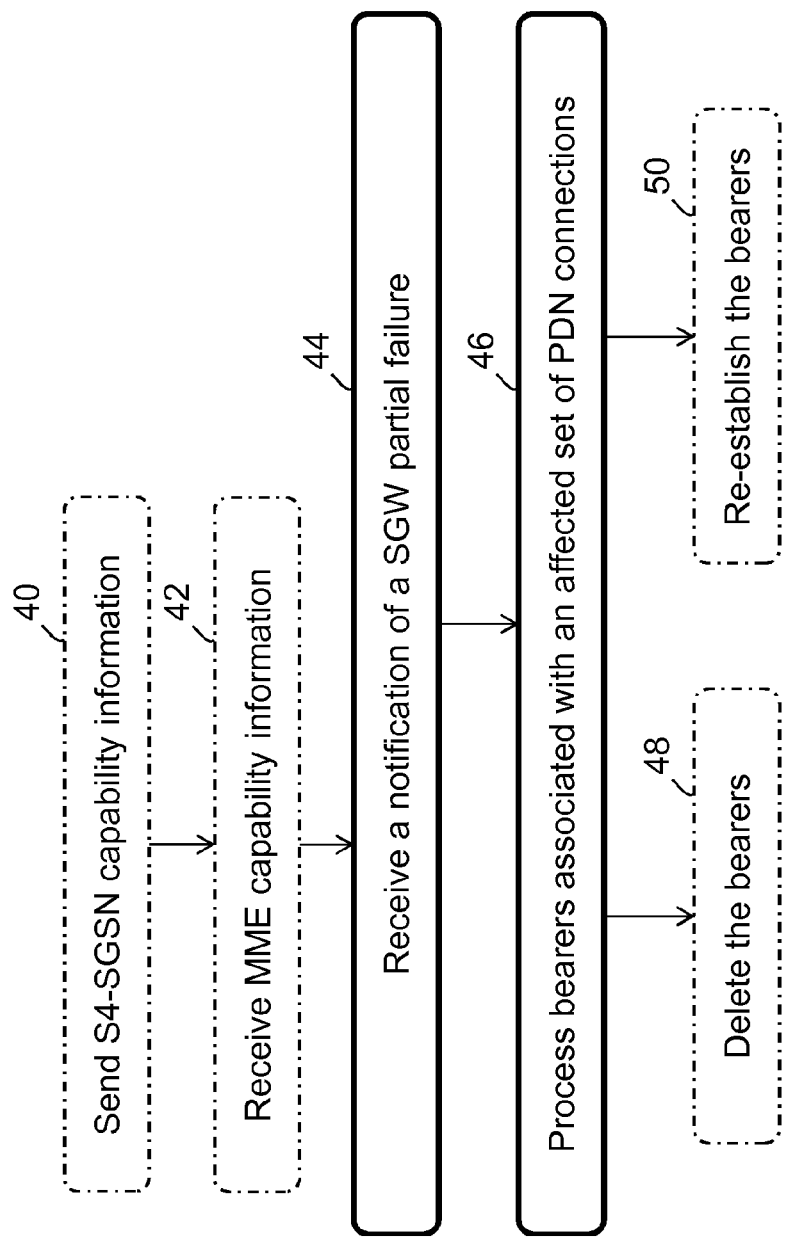
FIG. 9 is a flow diagram of example operations which may be taken by the S4-SGSN of FIG. 6, according to some of the example embodiments.

FIG. 9 is a flow diagram depicting example operations which may be taken by the S4-SGSN 110 of FIGS. 1-4 and 6 in the providing SGW partial failure handling. It should also be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 40

According to some of the example embodiments, the S4-SGSN 110 may be configured to send 40, to a MME 115, a context request message during a context transfer procedure. The context request message may comprise a S4-SGSN capability indicator indicating a support of a failure notification message. The interface circuitry 407 may be configured to send, to the MME 115, the context request message during the context transfer procedure.

It should be appreciated that the context transfer procedure may be the procedure illustrated in FIG. 3 (messages 8-10). Furthermore, the context request message may be similar to message 8 of FIG. 3. It should further be appreciated that the S4-SGSN capability indicator may also be provided in the context acknowledgement message, for example message 10 of FIG. 3.

Example Operation 42

According to some of the example embodiments, upon the sending 40, the S4-SGSN 110 may be configured to receive 42, from the MME 115, a context response message as a result of the context request message, the context response message may comprise a MME capability indicator indicating support for the failure notification message. The interface circuitry 407 may be configured to send, to the MME 115, the context response message.

It should be appreciated that the context transfer procedure may be the procedure illustrated in FIG. 3 (messages 8-10). Furthermore, the context request message may be similar to message 8 of FIG. 3. It should further be appreciated that such an exchange of information may be used by the MME and S4-SGSN to indicate whether or not each node supports SGW partial failure, according to the example embodiments. Furthermore, the exchange of information may also be used to provide instructions to the S4-SGSN on how bearers should be processed in the event of a SGW partial failure.

Operation 44

The S4-SGSN 110 is configured to receive 44, from the MME 115, a notification of a partial failure within the SGW node. The notification comprises an identification of at least one user equipment associated with an affected set of PDN connections. The interface circuitry 407 is configured to receive, from the MME 115, the notification of a partial failure within the SGW node.

It should be appreciated that such a notification may be similar to the failure notification message of FIG. 3 (message 20). Furthermore, it should be appreciated that the identification may be SGW FQ-CSID.

Operation 46

The S4-SGSN 110 is further configured to process 46 bearers associated with the affected set of PDN connections. The processing circuitry 411 is configured to process the bearers associated with the affected set of PDN connections. It should be appreciated that the processing may be performed based on instructions provided by any other node in the communications network. For example, any instructions that may have been provided during the context transfer procedure.

Example Operation 48

According to some of the example embodiments, the processing 46 may further comprise deleting 48 the bearers associated with the affected set of PDN connections. The processing circuitry 411 may be configured to delete the bearers associated with the affected set of PDN connections.

Example Operation 50

According to some of the example embodiments, the processing 46 may further comprise re-establishing 50 the bearers associated with the affected set of PDN connections. The processing circuitry 411 may be configured to re-establish the bearers associated with the affected set of PDN connections.

It should be noted that although terminology from 3GPP LTE has been used herein to explain the example embodiments, this should not be seen as limiting the scope of the example embodiments to only the aforementioned system.

Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a Mobility Management entity (MME) node, for partial failure handing when an Idle Mode Signalling Reduction (ISR) is activated, the MME node being comprised in a communications network, the method comprising:
    the MME receiving, from a Serving Gateway (SGW) node, a notification of a partial failure within the SGW node, the notification comprising an identification of at least one user equipment associated with a set of Packet Domain Network (PDN) connections affected by the partial failure;
    the MME processing bearers associated with the affected set of PDN connections; and
    the MME sending to a S4-Serving General Packet Radio Service Support Node (S4-SGSN) a failure notification message indicating that the SGW node has a partial failure, the failure notification message comprising the identification of the at least one user equipment associated with the affected set of PDN connections.

2. The method of claim 1, wherein the processing further comprises deleting or re-establishing the bearers associated with the affected set of PDN connections.

3. The method of claim 1, wherein the identification of the at least one user equipment is a corresponding International Mobile Subscriber Identity (IMSI) or a Fully qualified Tunnelling Endpoint Identifier (F-TEID).

4. The method of claim 1, further comprising:
    the MME receiving, from the S4-SGSN, a context request message and/or context acknowledge message during a context transfer procedure, the context request message and/or context acknowledge message comprising a S4-SGSN capability indicator indicating a support of the failure notification message; and
    the MME sending, to the S4-SGSN, a context response message as a result of the context request message, the context response message comprising a MME capability indicator indicating a support of the failure notification message.

5. A Mobility Management entity (MME) node for partial failure handing when an Idle Mode Signalling Reduction (ISR) is activated, the MME node being comprised in a communications network, the MME comprising:
    interface circuitry configured to receive, from a Serving Gateway (SGW) node, a notification of a partial failure within the SGW node, the notification comprising an identification of at least one user equipment associated with a set of Packet Domain Network (PDN) connections affected by the partial failure;
    processing circuitry configured to process bearers associated with the affected set of PDN connections; and
    the interface circuitry further configured to send, to a S4-Serving General Packet Radio Service Support Node (S4-SGSN), a failure notification message indicating that the SGW node has a partial failure, the failure notification message comprising the identification of the at least one user equipment associated with the affected set of PDN connections.

6. The MME of claim 5, wherein the processing circuitry is further configured to delete or re-establish the bearers associated with the affected set of PDN connections.

7. The MME of claim 5, wherein the identification of the at least one user equipment is a corresponding International Mobile Subscriber Identity (IMSI).

8. The MME of claim 5, wherein
the interface circuitry is further configured to receive, from the S4-SGSN, a context request message and/or context acknowledge message during a context transfer procedure, the context request message and/or context acknowledge message comprising a S4-SGSN capability indicator indicating a support of the failure notification message; and
the interface circuitry is also configured to send, to the S4-SGSN, a context response message as a result of the context request message, the context response message comprising a MME capability indicator indicating a support of the failure notification message.

9. A method, in a S4-Serving General Packet Radio Service Support Node (S4-SGSN), for partial failure handing when an Idle Mode Signalling Reduction (ISR) is activated, the S4-SGSN being comprised in a communications network, the method comprising:
the S4-SGSN receiving, from a Mobility Management Entity (MME), a failure notification message indicating that a Serving Gateway (SGW) node has a partial failure, the failure notification message comprising identification information for at least one user equipment associated with a set of PDN connections affected by the partial failure; and
S4-SGSN processing bearers associated with the affected set of PDN connections.

10. The method of claim 9, wherein the processing further comprises deleting or re-establishing the bearers associated with the affected set of PDN connections.

11. The method of claim 9, wherein the identification information for the at least one user equipment is a corresponding International Mobile Subscriber Identity (IMSI) or a Fully qualified Tunnelling Endpoint Identifier (F-TEID).

12. The method of claim 9, further comprising:
sending, to the MME, a context request message and/or a context acknowledge message during a context transfer procedure, the context request message and/or the context acknowledge message comprising a S4-SGSN capability indicator indicating a support of the failure notification message; and
receiving, from the MME, a context response message as a result of the context request message, the context response message comprising a MME capability indicator indicating a support of the failure notification message.

13. A S4-Serving General Packet Radio Service Support Node (S4-SGSN) for partial failure handing when an Idle Mode Signalling Reduction (ISR) is activated, the S4-SGSN being comprised in a communications network, the S4-SGSN comprising:
interface circuitry configured to receive, from a Mobility Management Entity (MME), a failure notification message indicating that a Serving Gateway (SGW) node has a partial failure, the failure notification message comprising identification information for at least one user equipment associated with a set of PDN connections affected by the partial failure; and
processing circuitry configured to process bearers associated with the affected set of PDN connections.

14. The S4-SGSN of claim 13, wherein the processing further comprises deleting or re-establishing the bearers associated with the affected set of PDN connections.

15. The S4-SGSN of claim 13, wherein the identification information for the at least one user equipment is a corresponding International Mobile Subscriber Identity (IMSI) or a Fully qualified Tunnelling Endpoint Identifier (F-TEID).

16. The S4-SGSN of claim 13, wherein the interface circuitry is further configured to send, to the MME, a context request message and/or a context acknowledge message during a context transfer procedure, the context request message and/or the context acknowledge message comprising a S4-SGSN capability indicator indicating a support of the failure notification message; and
the interface circuitry is also configured to receive, from the MME, a context response message as a result of the context request message, the context response message comprising a MME capability indicator indicating a support of the failure notification message.

* * * * *

UNITED STATES PATENT AND TRADEMARK OFFICE
CERTIFICATE OF CORRECTION

PATENT NO. : 9,219,643 B2
APPLICATION NO. : 13/666994
DATED : December 22, 2015
INVENTOR(S) : Yang Page 1 of 1

It is certified that error appears in the above-identified patent and that said Letters Patent is hereby corrected as shown below:

In the specification,

In Column 3, Line 24, delete "enhanced" and insert -- evolved --, therefor.

In Column 3, Line 51, delete "Type" and insert -- Technology --, therefor.

In Column 3, Line 59, delete "UTMS" and insert -- UMTS --, therefor.

In Column 11, Line 37, delete "identifying 34." and insert -- identifying 32. --, therefor.

Signed and Sealed this
Twenty-eighth Day of June, 2016

Michelle K. Lee
*Director of the United States Patent and Trademark Office*